(12) United States Patent
Lehr

(10) Patent No.: US 7,230,880 B2
(45) Date of Patent: Jun. 12, 2007

(54) ROTATIONAL PULSATION SYSTEM AND METHOD FOR COMMUNICATING

(75) Inventor: Jörg Lehr, Riethkamp (DE)

(73) Assignee: Baker Hughes Incorporated, Houston, TX (US)

( * ) Notice: Subject to any disclaimer, the term of this patent is extended or adjusted under 35 U.S.C. 154(b) by 350 days.

(21) Appl. No.: 10/725,353

(22) Filed: Dec. 1, 2003

(65) Prior Publication Data

US 2005/0117453 A1 Jun. 2, 2005

(51) Int. Cl.
*H04H 9/00* (2006.01)

(52) U.S. Cl. .......................... 367/84; 367/83; 340/855.4

(58) Field of Classification Search .................. 367/83, 367/84; 340/855.4; 175/48, 312, 314; 166/227
See application file for complete search history.

(56) References Cited

U.S. PATENT DOCUMENTS

| | | | | |
|---|---|---|---|---|
| 4,689,775 A | * | 8/1987 | Scherbatskoy | 367/83 |
| 4,785,300 A | * | 11/1988 | Chin et al. | 367/83 |
| 5,073,877 A | * | 12/1991 | Jeter | 367/84 |
| 5,182,731 A | * | 1/1993 | Hoelscher et al. | 367/84 |
| 5,215,152 A | * | 6/1993 | Duckworth | 175/48 |
| 5,319,610 A | * | 6/1994 | Airhart | 367/82 |
| 5,740,126 A | | 4/1998 | Chin et al. | 367/84 |
| 5,787,052 A | * | 7/1998 | Gardner et al. | 367/84 |
| 5,802,011 A | * | 9/1998 | Winters et al. | 367/83 |
| 6,469,637 B1 | | 10/2002 | Seyler et al. | 340/856.3 |
| 6,626,253 B2 | | 10/2003 | Hahn et al. | 175/48 |
| 6,714,138 B1 | | 3/2004 | Turner et al. | 340/854.3 |
| 2003/0062724 A1 | | 4/2003 | Gondron | |

FOREIGN PATENT DOCUMENTS

| EP | 0681090 A | 8/1995 |
|---|---|---|
| EP | WO 0229441 A | 11/2002 |

OTHER PUBLICATIONS

International Search Report, PCT/US2004/039584, Nov. 4, 2005.

* cited by examiner

*Primary Examiner*—Timothy Edwards, Jr.
(74) *Attorney, Agent, or Firm*—Cantor Colburn LLP

(57) ABSTRACT

Disclosed herein is a rotational pulsation system including a rotor having turbine blades to drive the rotor. A centralizer having coils and a stator package positioned to operably communicate with permanent magnets at the rotor and a rotational screen disk/static screen disk disposed at the rotor.

A method for communicating in a wellbore includes spinning a rotational pulsation system to create a first frequency and applying and removing an electrical load according to a message to be communicated.

25 Claims, 10 Drawing Sheets

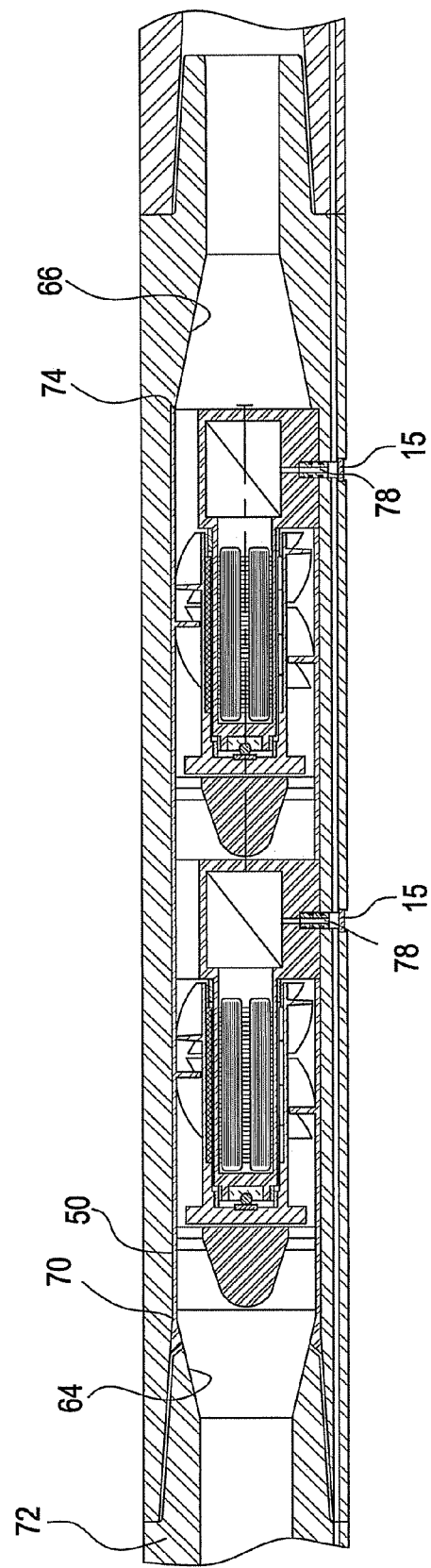

S-Mode with redundant signal transmission

S-Mode with X-channel transmission

ROTATIONAL PULSATION SYSTEM AND METHOD FOR COMMUNICATING

BACKGROUND

Communication and therefore data recovery and transmission from remote locations such as downhole locations in boreholes is often important to the purpose for which the borehole is being created. In the hydrocarbon industry, for example, communication from the downhole environment while drilling can dramatically improve operations and decision making at the surface.

Many devices have been used, and are still used, to accomplish this type of communication. Most are somewhat effective but rates of data transmission can be slow and in noisy environments, signals can be easily lost. Alternative devices and methods are always welcome in the art and particularly so if the data rates and/or signal integrity are improved.

SUMMARY

Disclosed herein is a rotational pulsation system including a rotor having turbine blades to drive the rotor. A centralizer having coils and a stator package positioned to operably communicate with permanent magnets at the rotor and a rotational screen disk/static screen disk disposed at the rotor.

A method for communicating in a wellbore includes spinning a rotational pulsation system to create a first frequency and applying and removing an electrical load according to a message to be communicated.

BRIEF DESCRIPTION OF THE DRAWINGS

Referring now to the drawings wherein like elements are numbered alike in the several Figures:

FIG. 2 is a cross-section of an arrangement employing to rotational pulsation systems;

DETAILED DESCRIPTION

Figure 1:
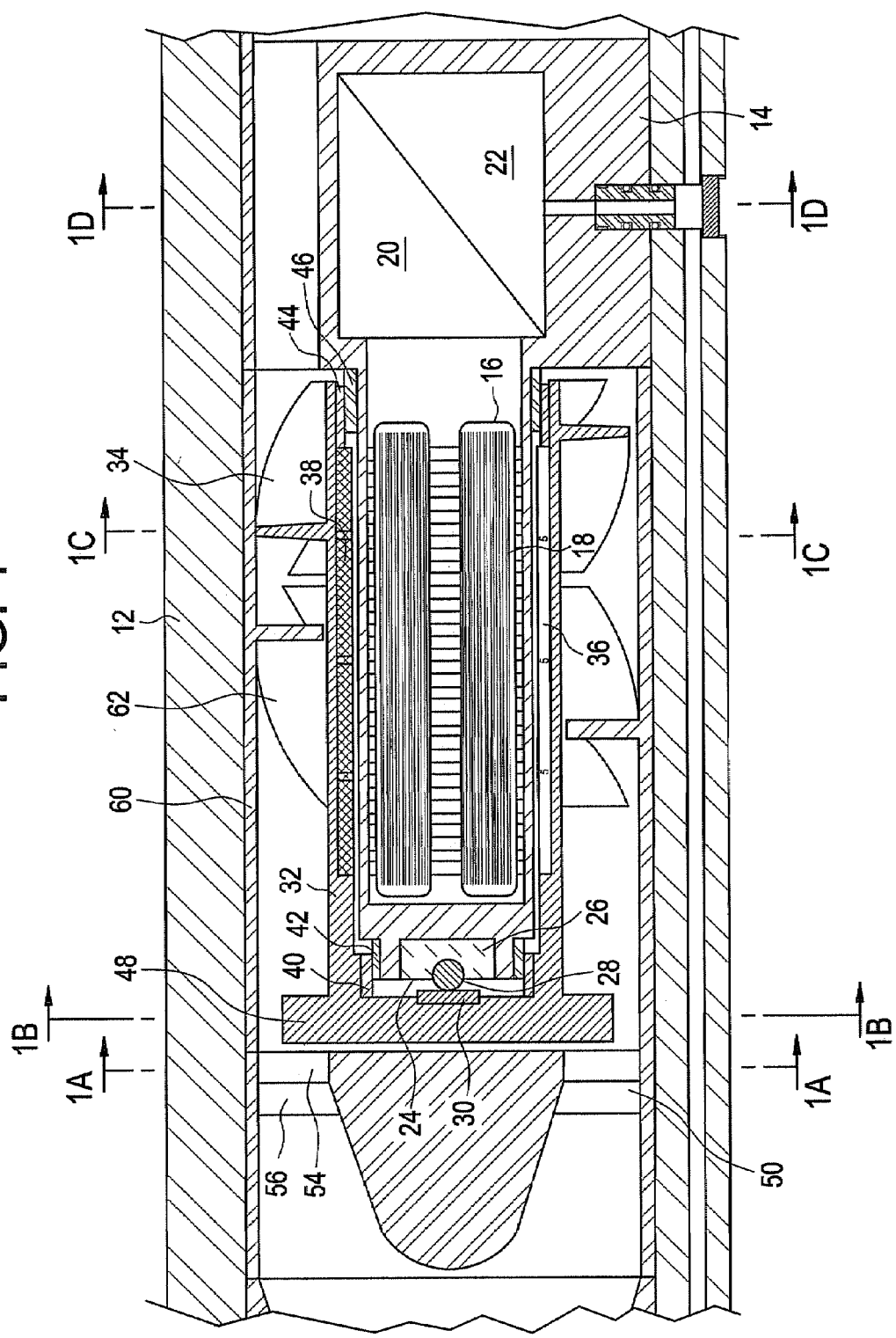
FIG. 1 is a cross-section view of a rotational pulsation system as disclose herein.

Referring to FIG. 1, one embodiment of a rotational pulsation system 10 is illustrated. The system includes a housing 12 which is a tubular housing and may be a portion of a tubing or drill string. Within housing 12 is disposed a non-magnetic pressure housing and centralizer 14 with flow openings 15 (FIG. 1D) which may be pinned in place by for example pin 15 pressed into housing 12 or affixed by other suitable fixing arrangement. Pressure housing 14 is configured to accept internally thereto induction windings 16 and a laminated stator package 18 which are to be stationary. Pressure housing 14 is also configured to interface with a load 20 and a load controller 22. It is to be appreciated that the load 20 may be of any type that causes a draw on the induction windings (e.g., to an electric machine with a heat sink) and therefore slows the turbine (discussed hereunder).

Housing 14 further includes a configuration to accept an axial bearing 24, which in one embodiment includes a resilient (e.g., rubber) mount 26, a ball 28, which may be spherical, and a plate 30. The plate 30 is in operable communication with the ball 28 at a small point of tangential intersection with ball 28. The small contact point ensures low friction.

The plate 30 portion of the axial bearing 24 is mounted at rotor 32. Rotor 32 is configured to rotate about pressure housing 14 due to fluid movements past a turbine 34 attached thereto. Rotor 32 mounts permanent magnets 36 and 38 and rides on radial bearings. In the illustrated embodiment there is an upper radial bearing set 40, 42 and a lower radial bearing set 44, 46. These bearings are in one embodiment, constructed of tungsten carbide, therefore having a long life. Moreover when the turbine is spinning rapidly they hydrodynamically float, reducing wear significantly.

Figure 1A:
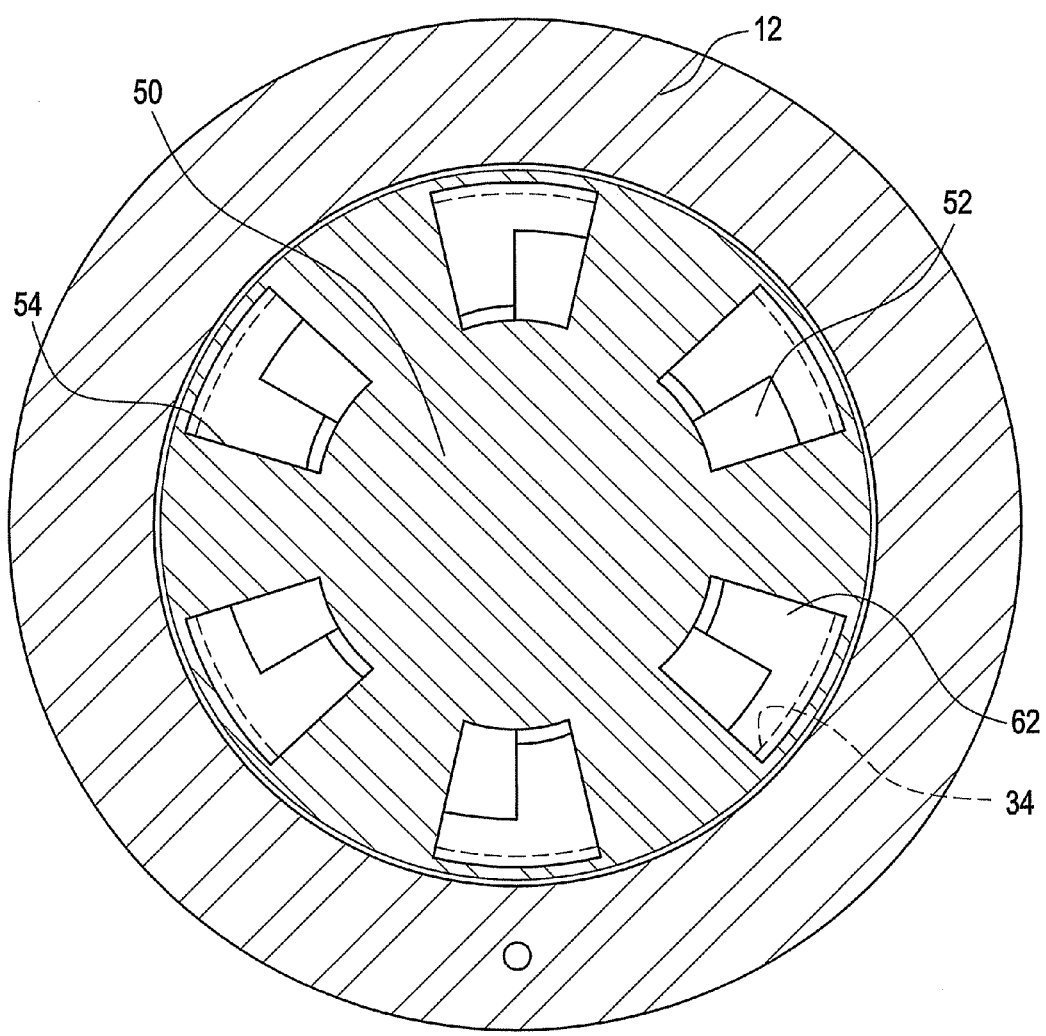
FIG. 1A is a transverse cross-section of the system depicted in FIG. 1 taken along section lines 1A—1A.
Figure 1B:
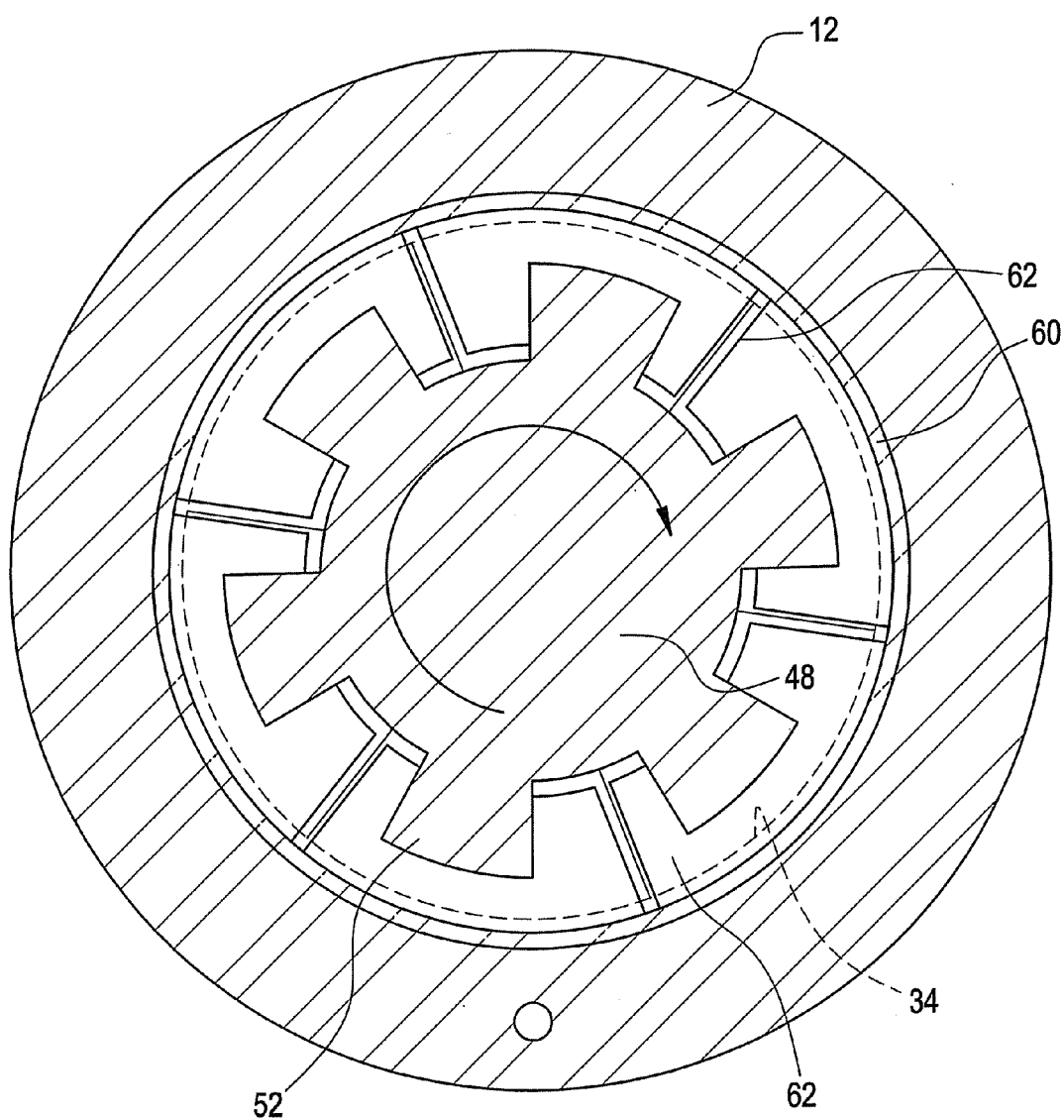
FIG. 1B is a transverse cross-section of the system depicted in FIG. 1 taken along section lines 1B—1B.

At the left side (as illustrated in FIG. 1) of rotor 32 is a rotational screen disk 48. Reference is made to FIG. 1B wherein a shape of disk 48 is visible. It is also apparent in both FIGS. 1 and 11B that the diametral dimension of disk 48 is less than that of a static screen disk 50 (visible in FIGS. 1 and 1A). This diametral difference is to ensure continued mud flow to turbine 34 when individual blades 52 of disk 48 and openings 54 and disk 50 are aligned. In FIG. 1A, the openings are partially occluded i.e., partially aligned. When the blades 52 are effectively closing the openings 54, the blades 52 and openings 54 are considered aligned. Still considering static screen disk 50, it is noted that the embodiment illustrated in FIG. 1 includes a beveled edge 56 for each opening 54. The beveled edge 56 has for its purpose to guide the flow into the open sections of the static screen disk and to reduce the flow turbulence.

Figure 1C:
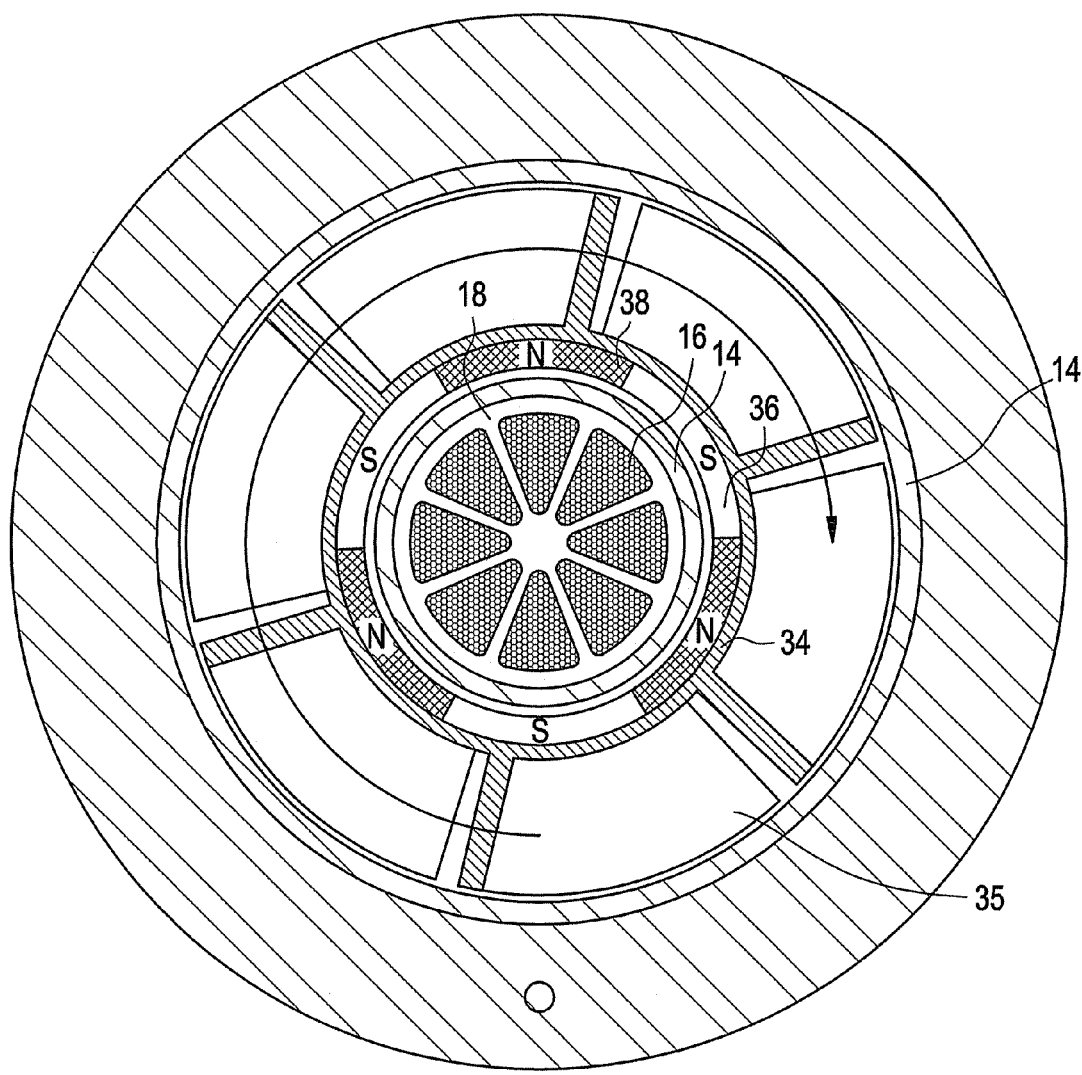
FIG. 1C is a transverse cross-section of the system depicted in FIG. 1 take along section lines 1C—1C.

To assist with the driving force of the mud flow on turbine 34, a guide wheel 60 having turbine type blading 62 (FIG. 1B) may be fixedly installed within housing 12 and is configured to shift the direction of mud flow toward a more normal angle relative to the surfaces 35 of the turbine blading (see FIG. 1C). This increases the velocity obtainable by the turbine thereby increasing the frequency range and electrical generation capability of the device. Since the basic mode of communication employing this system relies upon the difference between a steady state acoustic frequency of the system and an electrically loaded system induced lower frequency. These are received as logic high and logic low. It follows that the higher the original frequency the greater the flexibility of the system. Moreover, since the device is also intended to power downhole tools, such requirement causing an electrical load thus slowing the turbine, a higher initial free-of-load frequency leaves a greater range of frequency after the fixed tool load is applied.

Referring to FIG. 2, another embodiment is illustrated wherein two of the above-described devices are independently installed in housing 12. Although only two are illustrated, more may be installed. The greater the number of the devices the greater the communications capability. Individual components of the devices in FIG. 2 need not be specifically described as they are identical to those in FIG. 1. Further FIG. 2 illustrates the housing 12 in a pipe string, the configuration at both longitudinal ends of the device or devices having smoothly enlarging/restricting (left to right of drawing) inside dimension. This is for reduction of turbulence in the vicinity of the systems. It should also be noted that the terminal edge 70 of the uphole pipe 72 bears against static disk 50 to preload the same. At the other end of housing 12 shoulder 74 helps to retain the devices against the preload noted.

Figure 1D:
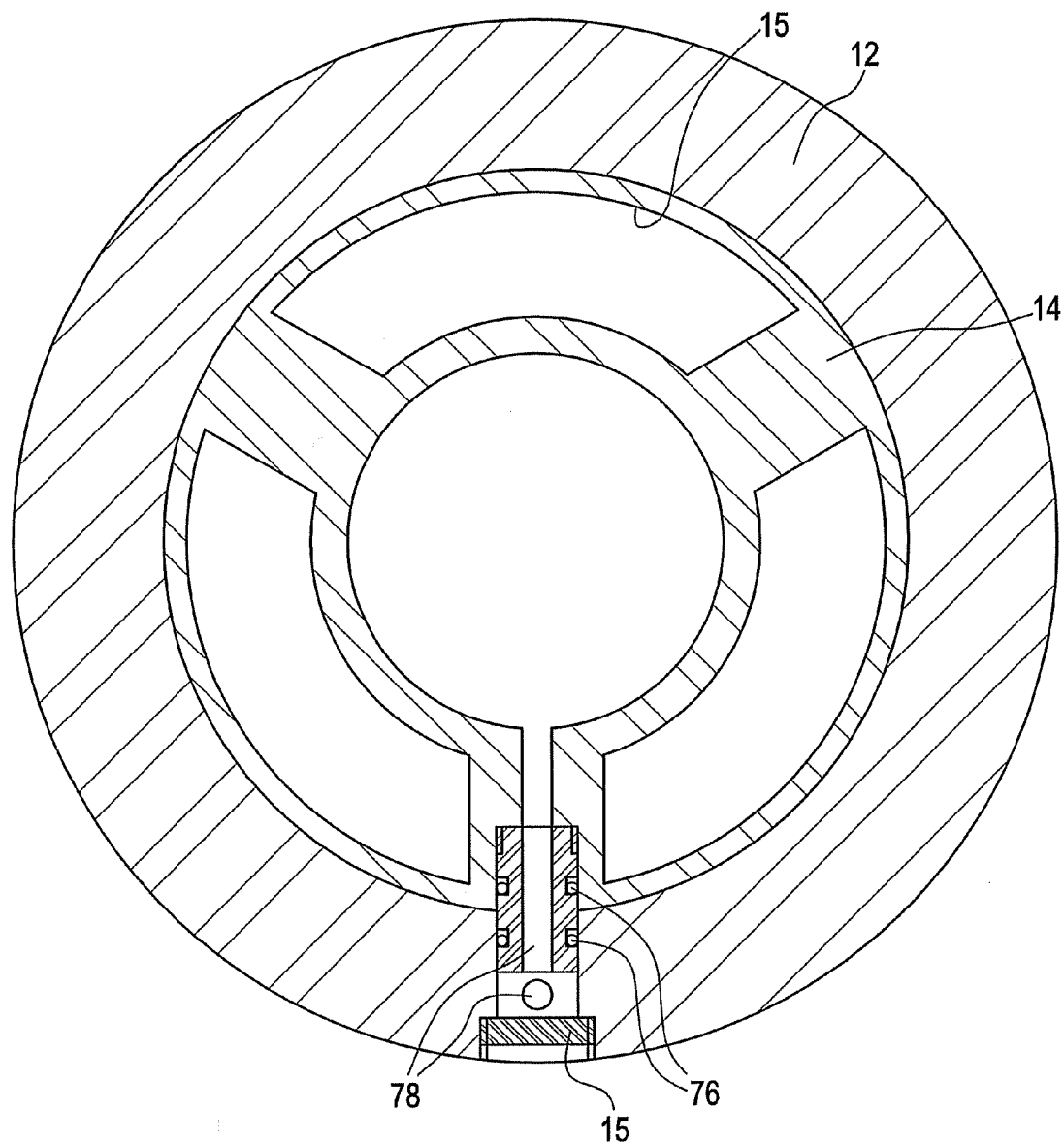
FIG. 1D is a transverse cross-section of the system depicted in FIG. 1 taken along section lines 1D—1D.

Referring to FIGS. 1, 1D and 2 and specifically to the previously identified pin 15, the same is intended to have multiple functions. Pin 15 includes seals 76, which may be o-rings, etc. to provide a seal against mud that may be present and under hydrostatic pressure between an outside surface of housing 14 and an inside surface of housing 12. Further, pin 15 includes a system of bores 78 therethrough to provide electrical access to the load controller 22 and load with heat sink 20. System 78 also provides for feed through of electrical (or other such as optical) media so that multiple pulsation devices are addressable electrically (optically, etc.) as illustrated in FIG. 2 with two devices. An electrical (or optic if optics are employed) conduit 80 is provided in housing 12 and the pipe string to connect the various devices with remote locations.

The rotational pulsation system 10 as described will immediately upon fluid flow therethrough originate an acoustic pulse which is propagated in the passing fluid. The frequency is a function of fluid velocity, fluid density and makeup and will be generally steady over time providing velocity and makeup do not change. This can be utilized in that as a result of the construction of the system 10, the frequency can be selectively altered by applying and removing an electrical load to/from the system 10. Such load causes electric braking of the rotational screen disk. Braking of the disk 48 changes the frequency by which openings and closed areas of the disk 48 pass openings 54 in the static disk 50 and thereby the ultimate pulsation frequency propagated in the fluid. By manipulating the load controller to selectively brake the disk 48, a logic high and a logic low can be created to generate a digital message propagated to a remote location through the fluid. It is noted that a single system also may power downhole tools and still communicate by calculating or adding the electrical load to the system 10, establishing a new base line (logic high or 1) and braking the system 10 from there to create logic low 0 or for a selected frequency lower than the steady state frequency.

In another method for communicating pursuant to this disclosure, a plurality of systems 10 are employed. With plural systems, additional power supply is available (simply because more than one system is present, each making power) for downhole tools as well as different methods of communication that either provide a "louder" (higher amplitude) signal generally for "noisier" environments or a higher data rate.

With respect to the higher amplitude, method of communication, a constructive interference is employed. This utilizes plural systems sending the same message at the same frequency. Not surprisingly, the data rate is not increased with this embodiment but the amplitude of the signal is increased making the signal easier to resolve at a remote location. In connection herewith, one possible configuration of the system described herein to practice this method is illustrated in an operational flow chart with a single load controller and is provided at FIG. 3. Where power is being used downhole, often the case to run MWD tools, and a plural system is in use, power consumption is one of the inputs to a controlled load splitter 100. Power consumption input is also provided to the load controller 102. This ensures that the power draw is balanced over the two systems 10 and accounted for with regard to the signals that will be propagated uphole. A further input to load controller 102 is the pulse sequence desired. Load controller 102 calculates the additional load needed to create a prescribed frequency drop and applies that load back to the splitter 100. It should be noted that frequency and phase shift of each of the system outputs are measured and corrected to ensure constructive interference to increase amplitude of the signal generated thereby increasing the signal clarity at a remote location. The frequency difference and phase shift calculation is done in box 104 with the result fed back to load controller 102.

Alternator-Brake Modules (A-B Modules) are generating the needed power for the power consumption and working as a speed manipulator in parallel. The current drawn through the module reduces the speed of the rotational parts of the system due to the transformation of mechanical into electrical power. The A-B Module includes mainly the Turbine 34, the permanent magnets 36, the rotor 32, the laminated stator package 18 and the induction windings 16. The current draw through the induction windings 16 within the stator winding package of the A-B Module creates a reactive torque to the magnets 36. The reactive torque will be directly transmitted to all components that are connected to the magnets and therefore will change their speed. These components are the Turbine 34, the Rotor 32, and the Bearings 44-40-30 as a part of the A-B Module and the Rotational Screen Disk 48 as a part of the Rotational Pulsation System (RPS). If the current draw through the windings 16 changes, with changing the power consumption of the load and/or splitting the MWD power consumption, the rotational frequency (f) of the RPS (Rotational Pulsation System) will be changed and a phase shift can be adjusted as well. The input to the A-B Module is the current and the output is the rotational frequency with a phase shift relative to a defined time point or a phase shift relative to a different RPS. Frequency and phase shift are measured over the inducted alternating voltage within the induction windings 16 of the A-B Module.

It is noted that turbine load and mud weight is also calculated in box 106 and input to load controller 102. Mud weight is relevant to calculate time delay of the pulses from each sequentially disposed system so that synchronization is effectable.

As a result of the foregoing operations pulsation is produced from each system in a constructive interference mode. The output of each system is indicated mathematically and illustrated to be summed (mathematically represented) centrally on the FIG. 3. Effectively, the amplitude of the resulting pressure wave moving uphole through the fluid therein is much greater and optimally significantly larger in amplitude than the individual outputs. Such arrangement makes detection at a remote location more assured. A graphic representation of a constructive interference condition with two to five sources is illustrated in FIG. 4.

Figure 5:
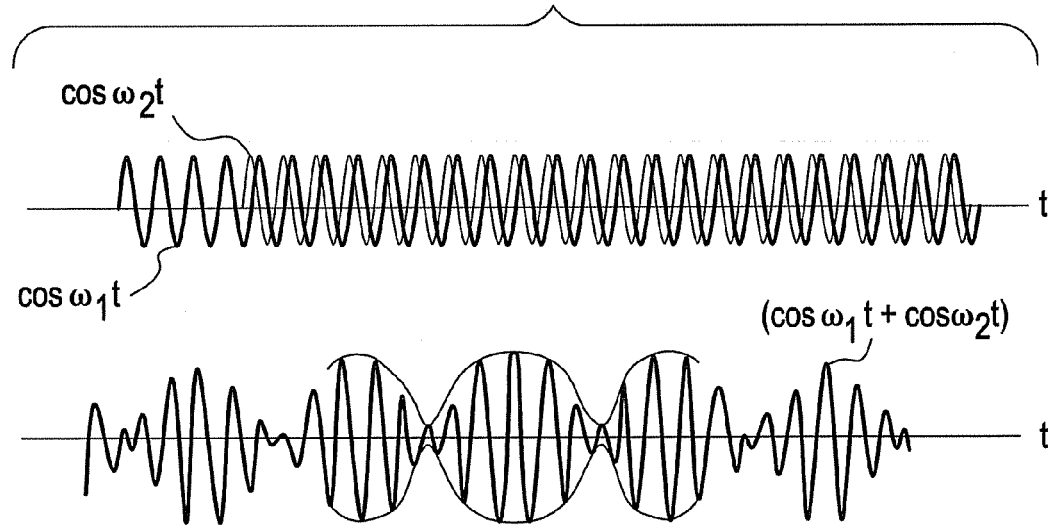
FIG. 5 is a representation of temporary interference conditions created by manipulating the modulation function of wave packages with slightly different frequencies.

To keep the pulse activation power requirement as low as possible, it is desirable to match the frequencies of the systems and manipulate only phase shift to control the constructive interference. It will be understood, however, that frequency and/or phase shift can be manipulated to produce various results taking into account location of the systems relative to one another and the weight of the mud in which the systems are operating. Wave packages with slightly different frequencies and therefore temporary interference conditions are illustrated in FIG. 5.

Figure 3:
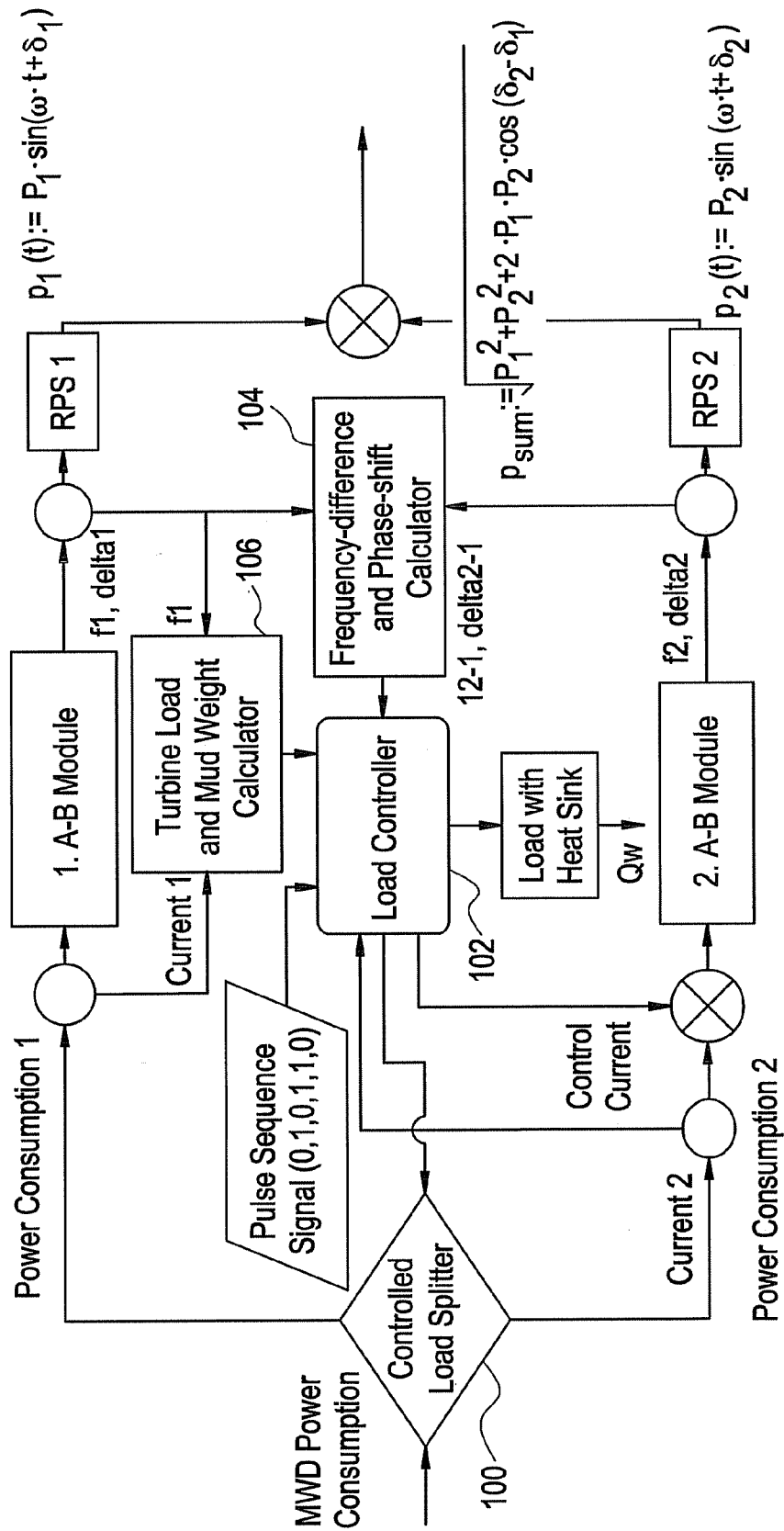
FIG. 3 is an operational flow chart of a two system arrangement.
Figure 4:
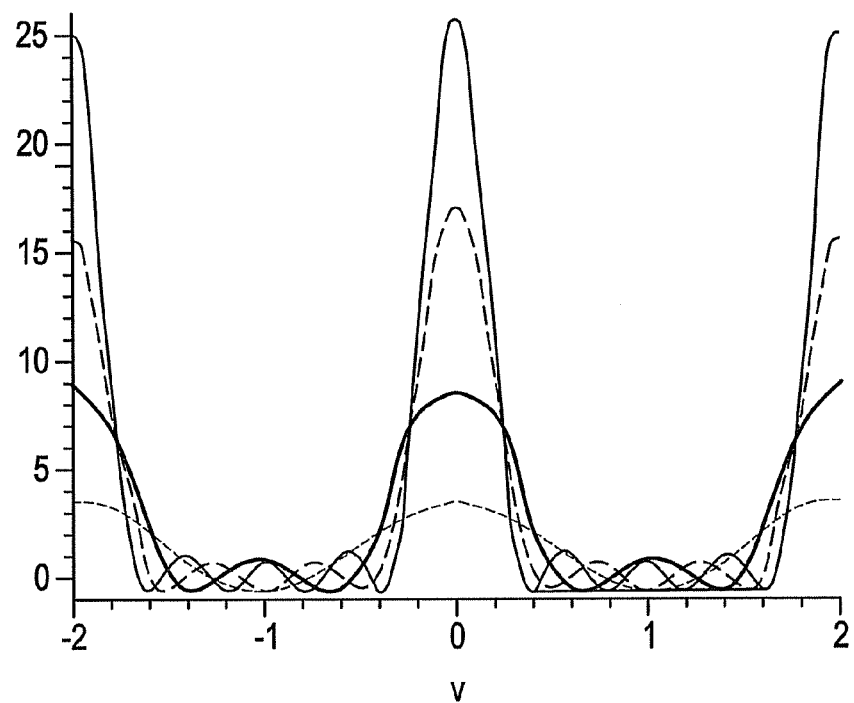
FIG. 4 is a graphic representation of a constructive interference condition for two to five sources.
Figure 6:
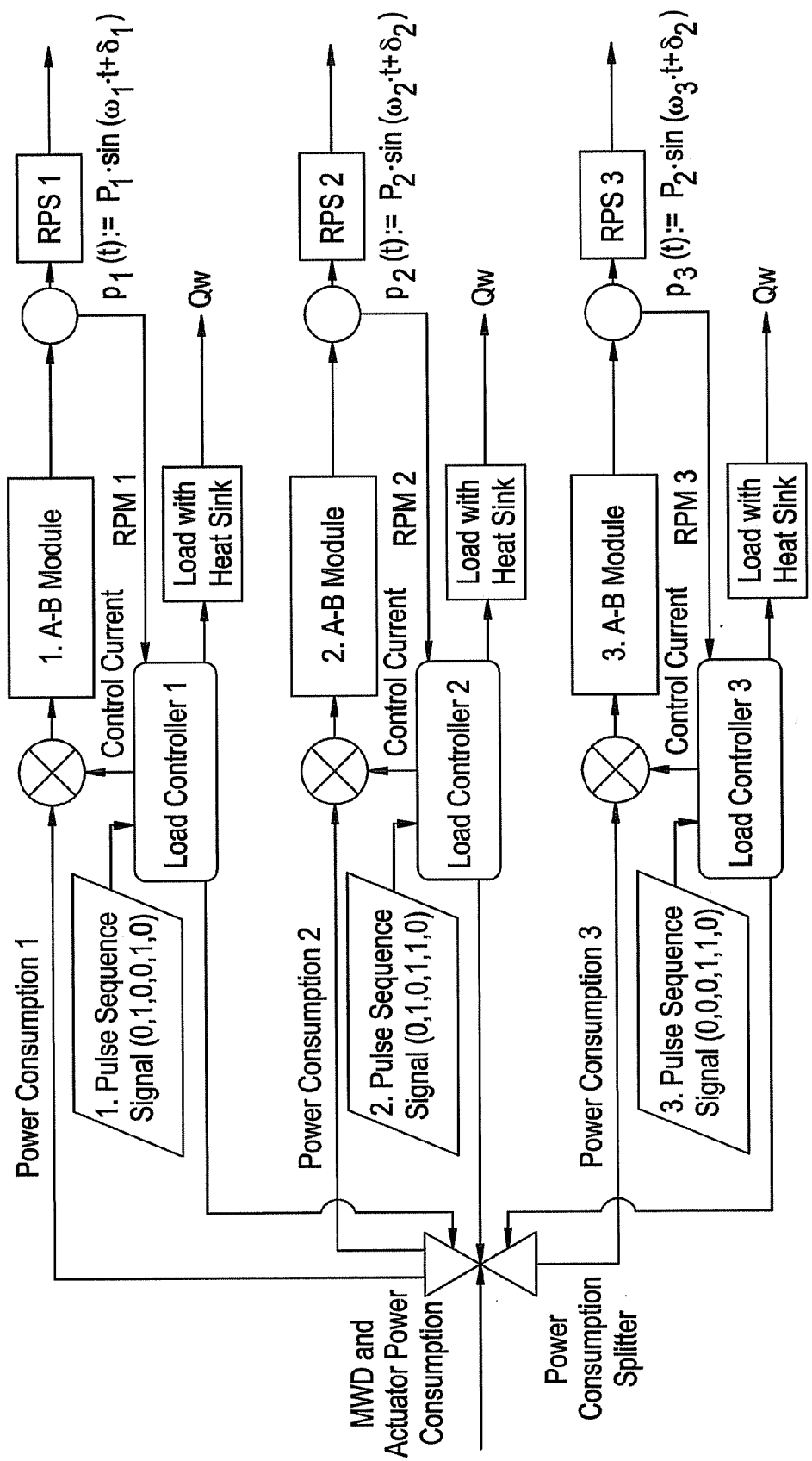
FIG. 6 is another graphic representation depicting pulsation frequency over time from three different systems in an individual frequency mode with redundant transmission.
Figure 7:
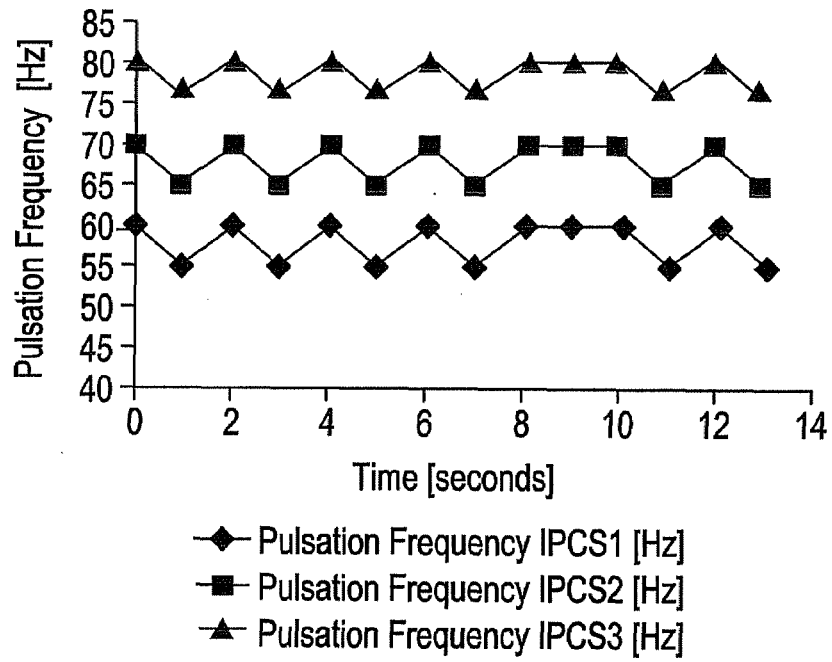
FIG. 7 is an operational flow chart of a multiple rotational pulsation system arrangement.

Alternatively to the interference mode just discussed, a multi-frequency mode using two (or more ) systems may also be employed, either using the configuration of FIG. 3 with a single load controller and controlled load splitter, or using individual, respective controllers, but without employing an intentional interference condition. In such a mode, a pair of frequencies is employed for each system which increases the data rate of the communication by a multiple equal to the number of systems utilized. This is illustrated in FIGS. 6 and 7, with three total systems. FIG. 6 is a flow diagram of a three system communication arrangement. FIG. 7 illustrates graphically the operation of the three systems, each of which has a pair of frequencies including logic 1 and logic 0. The frequencies may be used to send the same message as illustrated in FIG. 7 for redundancy of communication or may send different messages.

Figure 8:
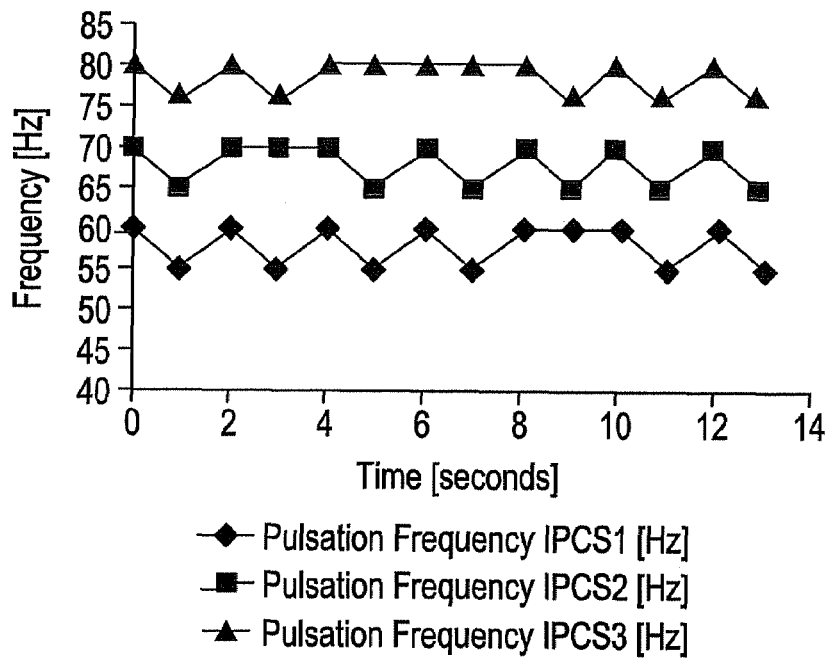
FIG. 8 is another graphic representation of frequency over time of the pulsation frequencies from three different systems in an individual frequency mode with cross-channel transmission.

Still referring to FIG. 6, and now FIG. 8 an even higher data rate may be obtained using the individual frequency pairs and additionally, cross-channel transmission using the difference between the individual frequency pairs. Where, for example, the communication arrangement contains two systems, two frequency pairs provide two of four possible data streams. Using cross-channel transmission, however, a third and a fourth stream is also realized due to the flowing possible variations if we use two frequency pairs, low 0 and high 1, with two systems: [(1;0),(0;1),(0;0),(1;1)]. Logic low 0 and logic high 1 rules have to be defined for each of the additional data streams. There are different possibilities to define highs and lows. E.g. the third data stream becomes logic low 0 if the lower frequency becomes logic high 1 and the higher frequency becomes logic low 0. The third data stream becomes logic high 1 if the lower frequency becomes logic low 0 and the higher frequency becomes logic high 1. The fourth data stream becomes logic low 0 if the lower frequency becomes logic low 0 and the higher frequency becomes logic low 0. The fourth data stream becomes logic high 1 if the lower frequency becomes logic high 1 and the higher frequency becomes logic high 1. To get the same data transmission rate as with channel 1 and 2 the third and the fourth channel will be summarized if needed.

As illustrated in FIG. 6, there are three systems in the communication arrangement allowing for six combinations of frequency pairs with the same data rate. These are the three individual outputs (see FIG. 6), RPS1 (pair 1), RPS2 (pair 2) RPS 3 (pair 3) and the cross-channel signals of between RPS1 and RPS2 (pair 4), RPS2 and RPS3 (pair 5) and RPS 3 and RPS 1 (pair 6). The number of source systems is limited only by practicality.

As illustrated in FIG. 6 as well, there are three systems in the communication arrangement allowing 8 variations with the usage of 3 logical highs and/or lows at the same time to work with cross-channel transmission to transmit complete words. The number of words N for a given number of sources S and the number of adjustable frequencies X per source is definable by the mathematical expression:

$$N = X^S$$

A graphic representation in FIG. 8 illustrates the operation of three systems each functioning at an individual frequency pair and with cross-channel transmission.

While preferred embodiments of the invention have been shown and described, various modifications and substitutions may be made thereto without departing from the spirit and scope of the invention. Accordingly, it is to be understood that the present invention has been described by way of illustration and not limitation.

What is claimed:
1. A rotational pulsation system comprising:
   a rotor having permanent magnets thereat;
   a turbine having blades configured to drive the rotor;
   a centralizer having coils and a stator package positioned to operably communicate with the permanent magnets;
   a rotational screen disk disposed at the rotor;
   a static screen disk disposed at the rotational screen disk.
2. A rotational pulsation system as claimed in claim 1 wherein the device further includes a guide having blades.
3. A rotational pulsation system as claimed in claim 2 wherein the guide blades direct a fluid flow therepast against the turbine blades.
4. A rotational pulsation system as claimed in claim 1 wherein the coils are electrically attached to a load controller.
5. A rotational pulsation system as claimed in claim 1 wherein an electrical load placed upon the coils causes the rotor when spinning to slow.
6. A rotational pulsation system as claimed in claim 1 wherein the system, in use, creates a pulse in a fluid flowing therethrough at a frequency.
7. A rotational pulsation system as claimed in claim 6 wherein the frequency is adjustable by varying an electrical load placed upon the coils.
8. A rotational pulsation system as claimed in claim 1 wherein a communication arrangement includes one or more of the systems of claim 1.
9. A rotational pulsation system as claimed in claim 8 wherein each system creates a distinct frequency pulse.
10. A rotational pulsation system as claimed in claim 8 wherein each system creates the same frequency pulse.
11. A rotational pulsation system as claimed in claim 8 wherein each system frequency is phase shifted from at least one other system frequency.
12. A method for communicating in a wellbore comprising:
   spinning a rotational pulsation system to create a first set of frequencies;
   applying an electrical load to the system to modify the first set of frequencies to a second respective set of frequencies;
   removing the electrical load to resume the first set of frequencies;
   adjusting a difference between a first frequency of the first set of frequencies and one of a second frequency of the first set of frequencies and a first frequency of the second set of frequencies; and
   selecting between the applying and removing conditions according to a message to be communicated.
13. A method for communicating in a wellbore as claimed in claim 12 wherein said spinning is caused by flowing a fluid past the system.
14. A method for communicating in a wellbore as claimed in claim 12 wherein said applying includes a constant load and a selectively applied load.

15. A method for communicating in a wellbore as claimed in claim 12 wherein said spinning includes spinning multiple systems each of which creates a first frequency and a second frequency.

16. A method for communicating in a wellbore as claimed in claim 15 wherein each system creates the same first frequency and second frequency resulting in constructive interference.

17. A method for communicating in a wellbore as claimed in claim 16 wherein said constructive interference is further manipulated using phase shifts.

18. A method for communicating in a wellbore as claimed in claim 15 wherein each system is configured to create a different first frequency and second frequency.

19. A method for communicating in a wellbore as claimed in claim 18 wherein the different frequencies are created by different electrical loads on each system.

20. A method for communicating in a wellbore as claimed in claim 15 wherein a difference between each system first frequency and second frequency is employed to create another communication frequency signal having a first frequency and a second frequency utilizing one frequency from each of two systems.

21. A method for communicating in a well bore as claimed in claim 20 with the spinning is spinning more than two systems and the communicating is by employing combinations of frequencies of at least two of the more than two systems to communicate.

22. A method for communicating in a well bore as claimed in claim 12 wherein said spinning includes spinning multiple systems, each system creating multiple frequencies.

23. A method for communicating in a wellbore comprising:

spinning a rotational pulsation system having multiple systems each of which creates a same first frequency and second frequency thereby creating a constructive interference at each frequency, applying an electrical load to the system to modify the first frequency to the second frequency of each system;

removing the electrical load to resume the first frequency of each system; and selecting between the applying and removing conditions according to a message to be communicated.

24. A method for communicating in a wellbore as claimed in claim 23 wherein said constructive interference is further manipulated using phase shifts.

25. A method for communicating in a wellbore comprising:

spinning multiple rotational pulsation systems, each system creating multiple frequencies;

applying an electrical load to the systems to modify the multiple frequencies removing the electrical load to resume the first frequency; and selecting between the applying and removing conditions according to a message to be communicated.

* * * * *